(12) United States Patent  
Duvnjak

(10) Patent No.: US 12,547,021 B2  
(45) Date of Patent: Feb. 10, 2026

(54) ADAPTABLE FRAME FOR HEAD MOUNTED WEARABLE DEVICE

(71) Applicant: GOOGLE LLC, Mountain View, CA (US)

(72) Inventor: Dejan Duvnjak, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 362 days.

(21) Appl. No.: 18/304,952

(22) Filed: Apr. 21, 2023

(65) Prior Publication Data

US 2023/0341709 A1  Oct. 26, 2023

Related U.S. Application Data

(60) Provisional application No. 63/363,585, filed on Apr. 26, 2022.

(51) Int. Cl.
*G02B 27/01* (2006.01)
*G02C 7/08* (2006.01)
*G06F 3/01* (2006.01)

(52) U.S. Cl.
CPC ............. *G02C 7/081* (2013.01); *G06F 3/013* (2013.01)

(58) Field of Classification Search
CPC ......... G06G 3/013; G02C 5/008; G02B 27/01
See application file for complete search history.

(56) References Cited

U.S. PATENT DOCUMENTS

| 2006/0164731 A1* | 7/2006 | Wu ........................... G02B 3/14 |
| | | 359/666 |
| 2007/0030440 A1 | 2/2007 | Spivey |
| 2017/0307905 A1 | 10/2017 | Blum et al. |
| 2018/0348860 A1* | 12/2018 | Lin ..................... G02B 27/0179 |
| 2018/0356652 A1 | 12/2018 | Shibuya et al. |
| 2019/0302479 A1* | 10/2019 | Smyth .................. G02B 26/004 |
| 2020/0310138 A1* | 10/2020 | Kamakura ........... H05K 9/0088 |
| 2021/0132397 A1* | 5/2021 | Stellman ............ G02B 27/0176 |

(Continued)

FOREIGN PATENT DOCUMENTS

WO   2016033926 A1   3/2016

OTHER PUBLICATIONS

"Engineers develop 'smart glasses' that automatically focus on what wearer seesNPL", Phys.org (https://phys.org/news/2017-01-smart-glasses-automatically-focus-wearer.html#google_vignette), University of Utah, Jan. 25, 2017, 3 pages.

*Primary Examiner* — Sanghyuk Park
(74) *Attorney, Agent, or Firm* — Brake Hughes Bellermann LLP

(57) ABSTRACT

Systems and methods for changing a shape of a lens portion of ophthalmic eyewear are provided. A microcontroller may apply a voltage to a deformable inner frame portion of a frame of the eyewear, causing deformation of the deformable inner frame. Rim portions of the frame may deform together with the deformable inner frame, causing a shape, or contour, of lenses coupled in the rim portions to change. The change in shape, or contour of the lenses may provide for a variation in vision correction, and transition between near distance vision correction and far distance vision correction. The application of voltage may be triggered by a change in interpupillary distance detected in data collected by a gaze tracking device coupled to the frame.

18 Claims, 12 Drawing Sheets

(56) References Cited

U.S. PATENT DOCUMENTS

2021/0223573 A1* 7/2021 Wang ............... G02C 11/10
2022/0413296 A1* 12/2022 Toride .............. G09G 3/003
2023/0041406 A1* 2/2023 Amirsolaimani ........ G02B 3/14

* cited by examiner

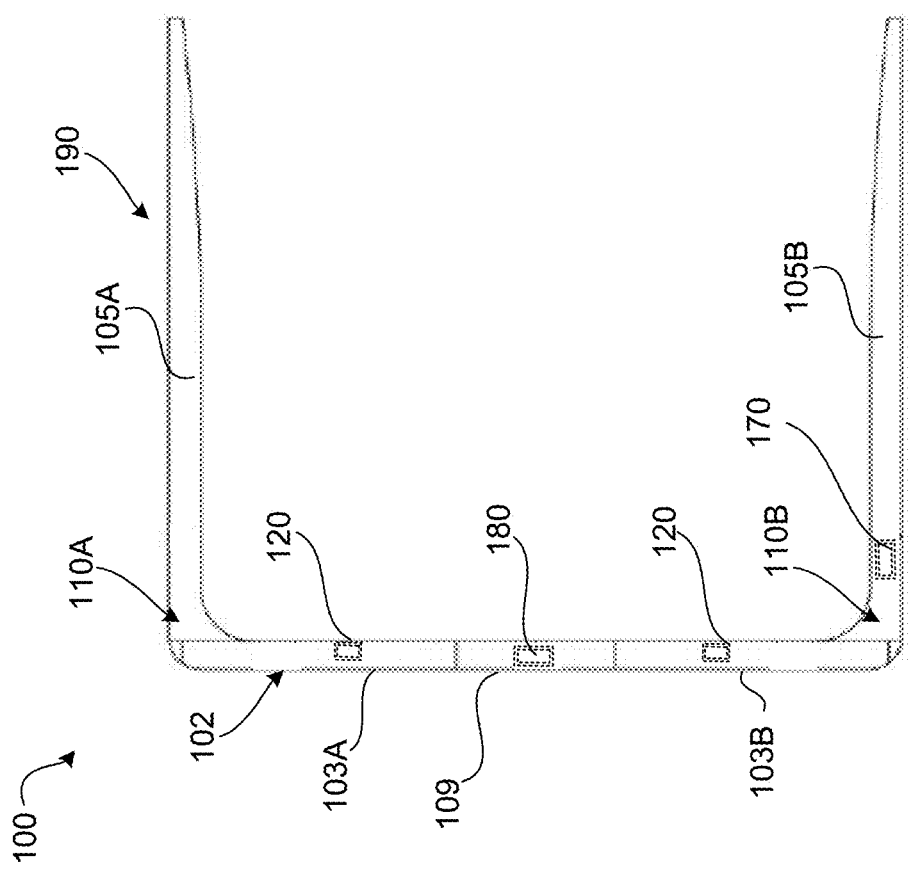

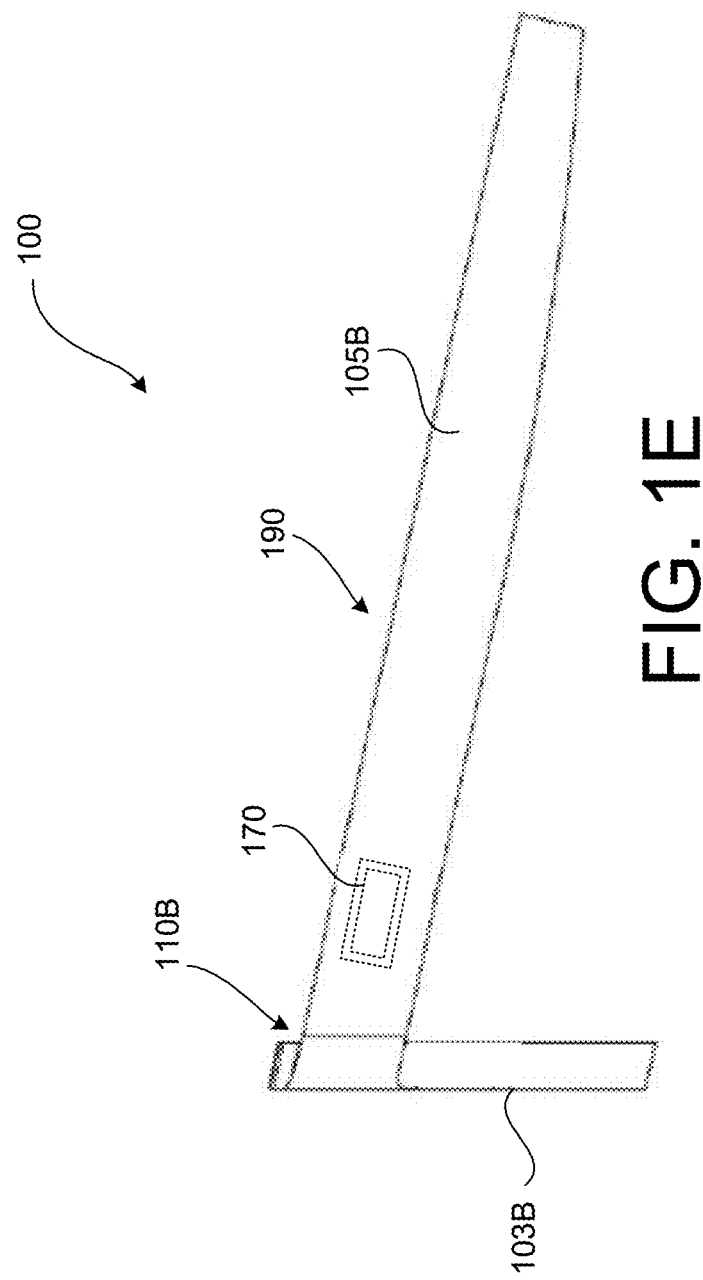

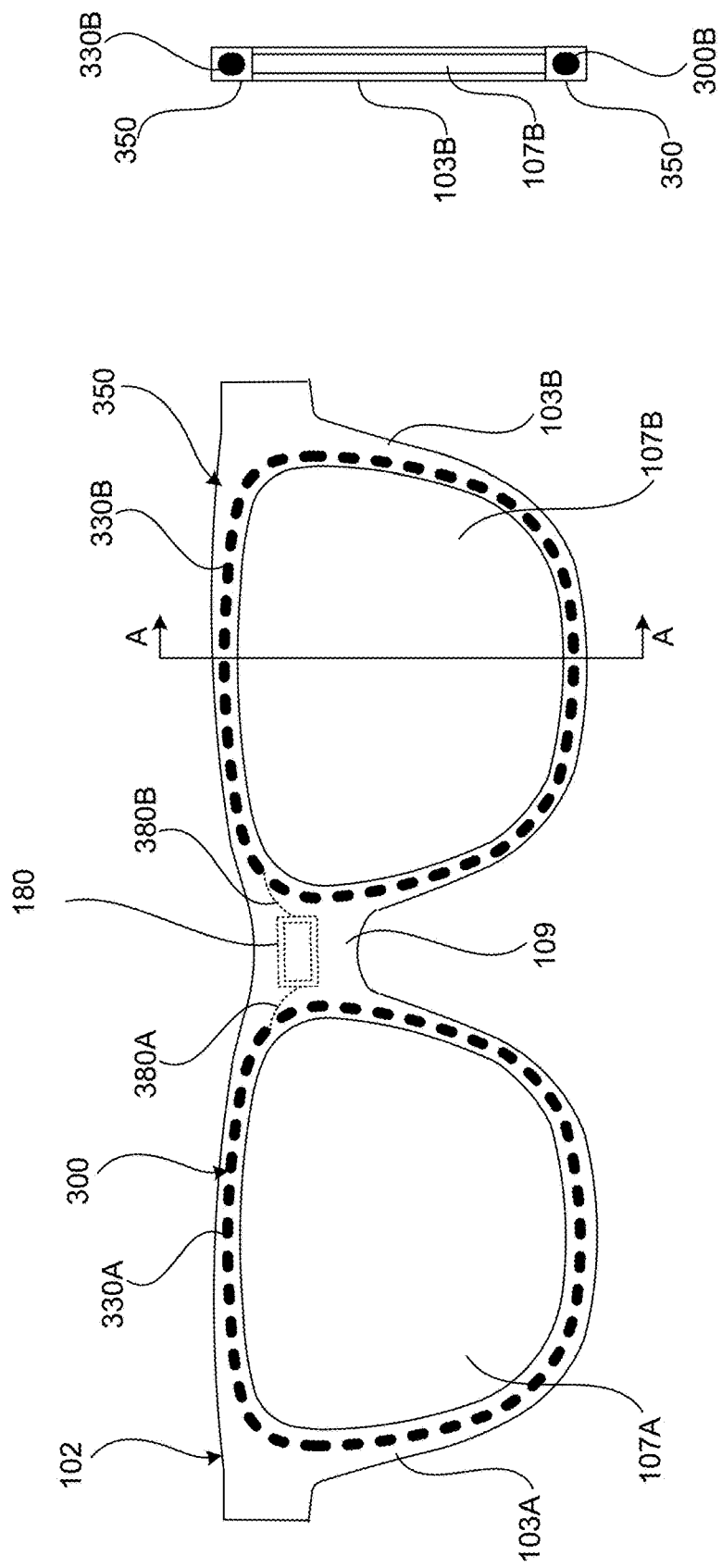

ADAPTABLE FRAME FOR HEAD MOUNTED WEARABLE DEVICE

CROSS REFERENCE TO RELATED APPLICATION

This application claims the benefit of U.S. Provisional Application No. 63/363,585, filed Apr. 26, 2022, the disclosure of which is incorporated herein by reference in its entirety.

TECHNICAL FIELD

This description relates in general to head mounted wearable devices, and in particular, to a frame of a head mounted wearable device that can be adapted for both near vision and distance vision.

BACKGROUND

Ophthalmic eyewear in the form of glasses may be worn by a user to, for example, provide for vision correction, reduce the effect of sunlight and/or glare, provide a measure of safety, and the like. In some situations, ophthalmic eyewear may incorporate corrective lenses that are optimized for either near vision correction (which causes objects in the distance to be indistinct, or blurred), or distance vision correction (which causes objects in the near field to be indistinct, or blurred). This may cause a user to remove and/or replace the eyewear to adapt to particular circumstances. In some situations, ophthalmic eyewear may incorporate bifocal lenses that provide for correction of both near vision and distance vision. Current bifocal lenses typically include separate sections that provide for correction of near vision separately from the correction of distance vision. The arrangement of bifocal corrective lenses may be somewhat restrictive, in that the user can only use a specific portion of the bifocal lens for near vision correction, and a (different) specific portion of the bifocal lens for distance vision correction. Ophthalmic eyewear including a frame and lenses that can be adapted for near vision correction in a first mode, and for distance vision correction in a second mode, may provide the user with a more comprehensive vision correction solution without the limitations associated with the separate near vision and distance vision correction sections of bifocal lenses.

SUMMARY

In one general aspect, a head mounted wearable device includes a frame, including a first rim portion; a second rim portion; a bridge portion connecting the first rim portion and the second rim portion; a deformable inner frame; and a microcontroller coupled to the frame, The microcontroller may be configured to apply a stimulus to the deformable inner frame. The first rim portion and the second rim portion may be configured to transition from a first state to a second state in response to the stimulus applied to the deformable inner frame.

In some implementations, the deformable inner frame is configured to deform in response to the stimulus applied to the deformable inner frame by the microcontroller; and the first rim portion and the second rim portion are configured to deform in response to deformation of the deformable inner frame.

In some implementations, a contour of a first lens portion coupled in the first rim portion is configured to change in response to deformation of the first rim portion; and a contour of a second lens portion coupled in the second rim portion is configured to change in response to deformation of the second rim portion.

In some implementations, the first state is a neutral state in which no stimulus is applied to the deformable inner frame, the frame of the head mounted wearable device is in an undeformed state, and the first lens portion and the second lens portion are configured for far distance vision; and the second state is an actuated state in which the stimulus is applied to the deformable inner frame, the frame of the head mounted wearable device is in a deformed state, and the first lens portion and the second lens portion are configured for near distance vision.

In some implementations, the frame of the head mounted wearable device is configured to remain in the actuated state in response to continued application of the stimulus to the deformable inner frame by the microcontroller; and the frame of the head mounted wearable device is configured to revert to the neutral state in response to termination of the stimulus applied to the deformable inner frame.

In some implementations, the frame includes an outer layer surrounding the deformable inner frame, wherein the outer layer includes an insulating material that retains heat in the deformable inner frame in the second state.

In some implementations, a gaze tracking device is coupled to the frame and configured to collect eye gaze data, wherein the microcontroller is configured to apply the stimulus to the deformable inner frame based on the eye gaze data collected by the gaze tracking device.

In some implementations, the microcontroller is configured to detect an interpupillary distance based on the eye gaze data collected by the gaze tracking device; apply the stimulus to the deformable inner frame in response to a determination that the interpupillary distance is less than or equal to a set threshold interpupillary distance; and terminate application of the stimulus in response to a determination that the interpupillary distance is greater than the set threshold interpupillary distance.

In some implementations, the deformable inner frame is made of a memory shape metal alloy material.

In some implementations, the deformable inner frame includes a first deformable member corresponding to the first rim portion; and a second deformable member corresponding to the second rim portion.

In some implementations, the deformable inner frame does not extend into the bridge portion, such that the bridge portion is not deformed in response to the stimulus applied to the deformable inner frame by the microcontroller.

In some implementations, a contour of the first deformable member corresponds to a contour of the first rim portion; a contour of the second deformable member corresponds to a contour of the second rim portion; and a contour of an outer layer surrounding the first deformable member and the second deformable member corresponds to the contour of the first rim portion and the contour of the second rim portion.

In another general aspect, a method includes obtaining, by a gaze tracking device of a head mounted wearable device, eye gaze data; detecting an interpupillary distance based on the eye gaze data; operating in a first mode in response to detecting that the interpupillary distance is greater than or equal to a previously set threshold; and operating in a second mode in response to detecting that the interpupillary distance is less than the previously set threshold, including applying, by a microcontroller of the head mounted wearable device, a stimulus to a deformable inner frame of a frame of the head mounted wearable device; and deforming the deformable inner frame in response to the stimulus.

In some implementations, deforming the deformable inner frame in response to the stimulus includes deforming a first deformable member of the deformable inner frame corresponding to a first rim portion of the frame; and deforming a second deformable member of the deformable inner frame corresponding to a second rim portion of the frame.

In some implementations, the method includes altering a contour of a first lens portion held in the first rim portion in response to deforming the first deformable member and the first rim portion; and altering a contour of a second lens portion held in the second rim portion in response to deforming the second deformable member and the second rim portion.

In some implementations, in the first mode, a frame of the head mounted wearable device is in a neutral state in which no stimulus is applied to the deformable inner frame, the frame is in an undeformed state, and a first lens portion and a second lens portion of the head mounted wearable device are configured for far distance vision; and in the second mode, the frame of the head mounted wearable device is in an actuated state in which the stimulus is applied to the deformable inner frame, the frame of the head mounted wearable device is in a deformed state, and the first lens portion and the second lens portion are configured for near distance vision.

In some implementations, the method includes, while operating in the second mode, detecting that the interpupillary distance is greater than or equal to the previously set threshold; terminating application of the stimulus to the deformable inner frame; and reverting to the neutral state in response to terminating the application of the stimulus.

In some implementations, the deformable inner frame includes a first deformable member made of a memory shape metal alloy material, corresponding to a first rim portion of a frame of the head mounted wearable device; and a second deformable member made of a memory shape metal alloy material, corresponding to a second rim portion of the frame of the head mounted wearable device.

In some implementations, the deformable inner frame does not extend into a bridge portion extending between the first rim portion and the second rim portion of the frame of the head mounted wearable device, such that the bridge portion is not deformed in response to applying the stimulus to the deformable inner frame.

In some implementations, operating in the second mode includes deforming the first rim portion and altering a contour of a first lens portion held in the first rim portion in response to applying the stimulus to the first deformable member of the deformable inner frame; and deforming the second rim portion and altering a contour of a second lens portion held in the second rim portion in response to applying the stimulus to the second deformable member of the deformable inner frame.

The details of one or more implementations are set forth in the accompanying drawings and the description below. Other features will be apparent from the description and drawings, and from the claims.

BRIEF DESCRIPTION OF THE DRAWINGS

FIG. 1D is a top view, and FIG. 1E is a side view, of an example head mounted wearable device that may be worn by the user shown in FIG. 1A, in accordance with implementations described herein.

FIGS. 3A and 3B illustrate a front frame portion of the example head mounted wearable device shown in FIGS. 1A-1F in a first state, in accordance with implementations described herein.

DETAILED DESCRIPTION

Figure 1A:
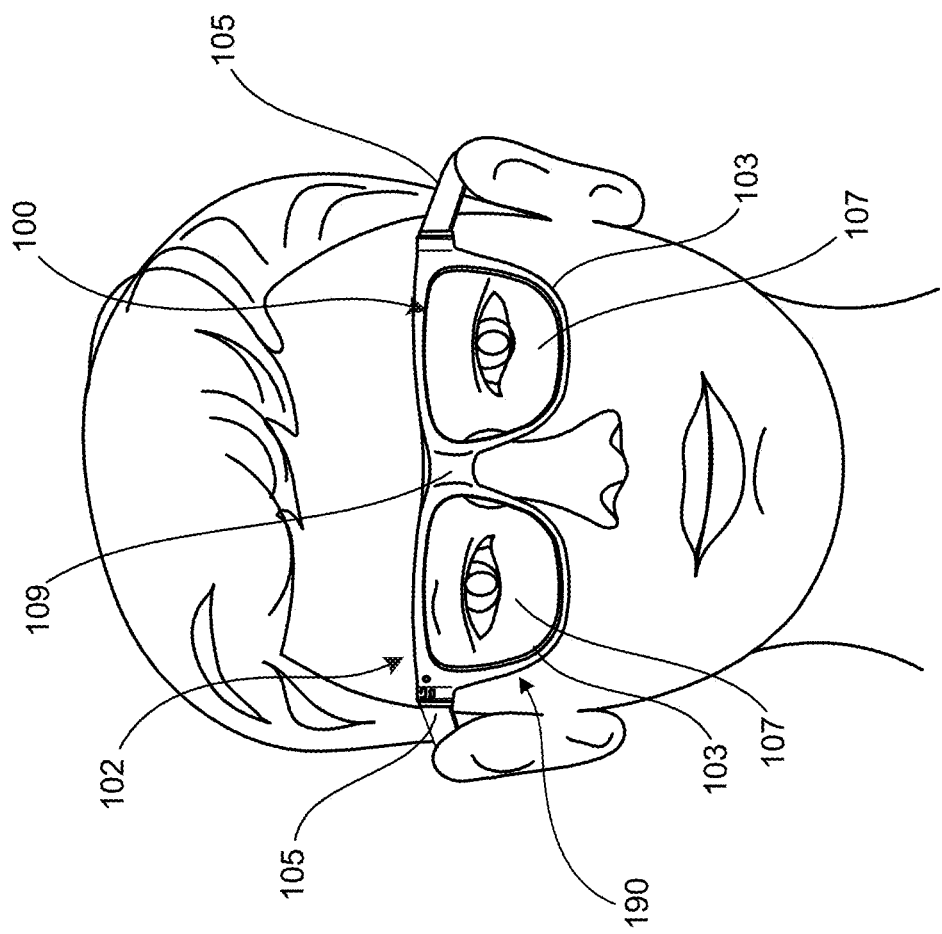
FIG. 1A illustrates an example head mounted wearable device worn by a user, in accordance with implementations described herein.

This disclosure relates to eyewear, and in particular, eyewear that is adaptable between a first mode that provides for far distance vision and/or far distance vision correction, and a second mode that provides for near distance vision and/or near distance vision correction. Adaptability may be provided in the form of deformation, or bending, or flexing, of rim portions and lens portions of a frame of the eyewear, such that a bending and/or flexing and/or deformation of the rim portions and/or a contour (and/or a change in or an altering of a contour) of the lens portions provides for a desired level of vision correction for a particular user. In some examples, a stimulus applied to the rim portions of the frame may cause deformation of the rim portions. In some examples, the stimulus may be applied to a deformable inner frame portion corresponding to the rim portions of the frame. Deformation of the rim portions may in turn cause a change in, or an altering of, a contour of the lenses. Selective changes or alterations in the contour of the lenses may provide for a desired level of vision/vision correction. In some examples, application of the stimulus to the deformable inner frame portion may be based on a detected interpupillary distance, or a detected change in interpupillary distance, that is indicative of a change in user gaze, between far distance vision and near distance vision.

Eyewear, or glasses, may include prescription or corrective lenses that provide for vision correction. Some lenses may provide for correction of myopia, or nearsightedness, in which the user's far distance vision requires correction. Some lenses may provide for correction of presbyopia, or farsightedness, in which the user's near distance vision requires correction. Users who need both near distance vision correction and far distance vision correction may have separate pairs of glasses, or may have glasses including bifocal lenses. Bifocal lenses include a first section that provides for near distance vision correction, and a second section that provides for far distance vision and/or far distance vision correction. Some users may prefer bifocal lenses to provide for near distance vision correction, with no need for far distance vision correction. In this instance, the bifocal lenses would include a first (near vision) section that provides for the near distance vision correction, and a second (distance vision) section that does not provide for any correction. While the bifocal lenses may provide for correction of both near vision and far distance vision, it may be inconvenient for the user to be limited to only one specific portion of the lens for near distance vision, and only one specific portion of the lens for far distance vision. Ophthalmic eyewear that is adaptable to provide for both near distance vision/vision correction and far distance vision/vision correction, without the use of bifocal lenses, may provide a convenient solution for users in this situation.

A head mounted wearable device, in the form of glasses, in accordance with implementations described herein, may be operable in a first mode that provides for far distance vision/vision correction, and in a second mode that provides for near distance vision/vision correction. In some examples, the head mounted wearable device may include a frame including deformable rim portions. In some examples, the rim portions of the frame may be selectively deformed in response to a stimulus applied to the rim portions. In some examples, the stimulus may be applied to a deformable inner frame portion of the frame. In some examples, a contour of lens portions received in the rim portions may be selectively adapted or altered in response to the deformation of the rim portions. The deformation of the rim portions and corresponding change or alteration in contour of the lens portions may provide for a desired level of vision correction. In some examples, the stimulus may be selectively applied (i.e., to the rim portions and/or to a portion of the deformable inner frame portion corresponding to the rim portions) based on a detected distance between the pupils of the user. In some examples, the stimulus may be selectively applied (i.e., to the rim portions and/or to a portion of the deformable inner frame portion corresponding to the rim portions) based on a change in the detected distance between the pupils of the user. In this manner, the functionality of the head mounted wearable device may be adapted based on the needs of the user, substantially real time, without user intervention, i.e., substantially automatically.

Figure 1B:
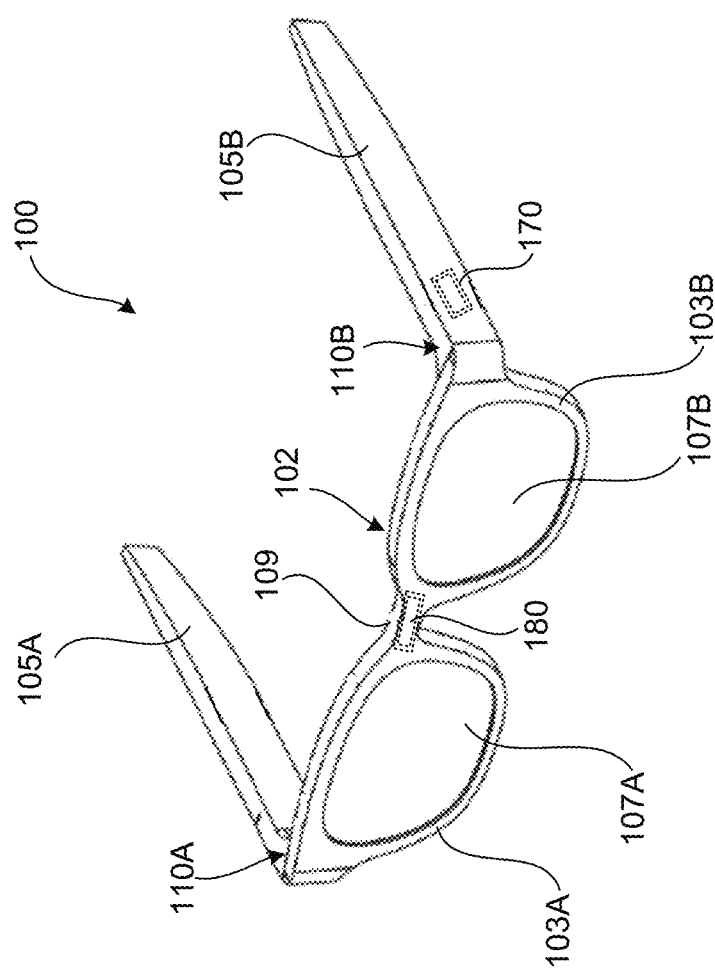
FIG. 1B is a perspective view.

FIG. 1A illustrates a user wearing an example head mounted wearable device 100, or glasses. In some examples, the example head mounted wearable device 100 is in the form of ophthalmic eyewear including corrective lenses. In some examples, the head mounted wearable device 100 may be a pair of smart glasses, or augmented reality glasses, including display capability and computing/processing capability. The principles to be described herein may be applied to these types of eyewear, and other types of eyewear, both with and without display capability and/or computing/processing capability. FIG. 1B is a perspective view, FIG. 1C is a rear view, FIG. 1D is a top view, and FIG. 1E is a side view, of the example head mounted wearable device 100 shown in FIG. 1A.

As shown in FIG. 1A, the example head mounted wearable device 100 includes a frame 190. The frame 190 includes a front frame portion 102 defined by rim portions 103 surrounding respective lens portions 107, with a bridge portion 109 connecting the rim portions 103. Arm portions 105 are coupled, for example, pivotably or rotatably coupled, to the front frame portion 102 by hinge portions 110. In some examples, the lens portions 107 may be corrective/prescription lenses. FIGS. 1B-1E illustrate that the lens portions 107 and rim portions 103 include a first lens portion 107A received in a first rim portion 103A, and a second lens portion 107B received in a second rim portion 103B. FIGS. 1B-1E illustrate that the arm portions 105 and hinge portions 110 include a first arm portion 105A coupled to the front frame portion 102 by a first hinge portion 110A in the area of the first rim portion 103A, and a second arm portion 105B coupled to the front frame portion 102 by a second hinge portion 110B in the area of the second rim portion 103B.

Figure 1C:
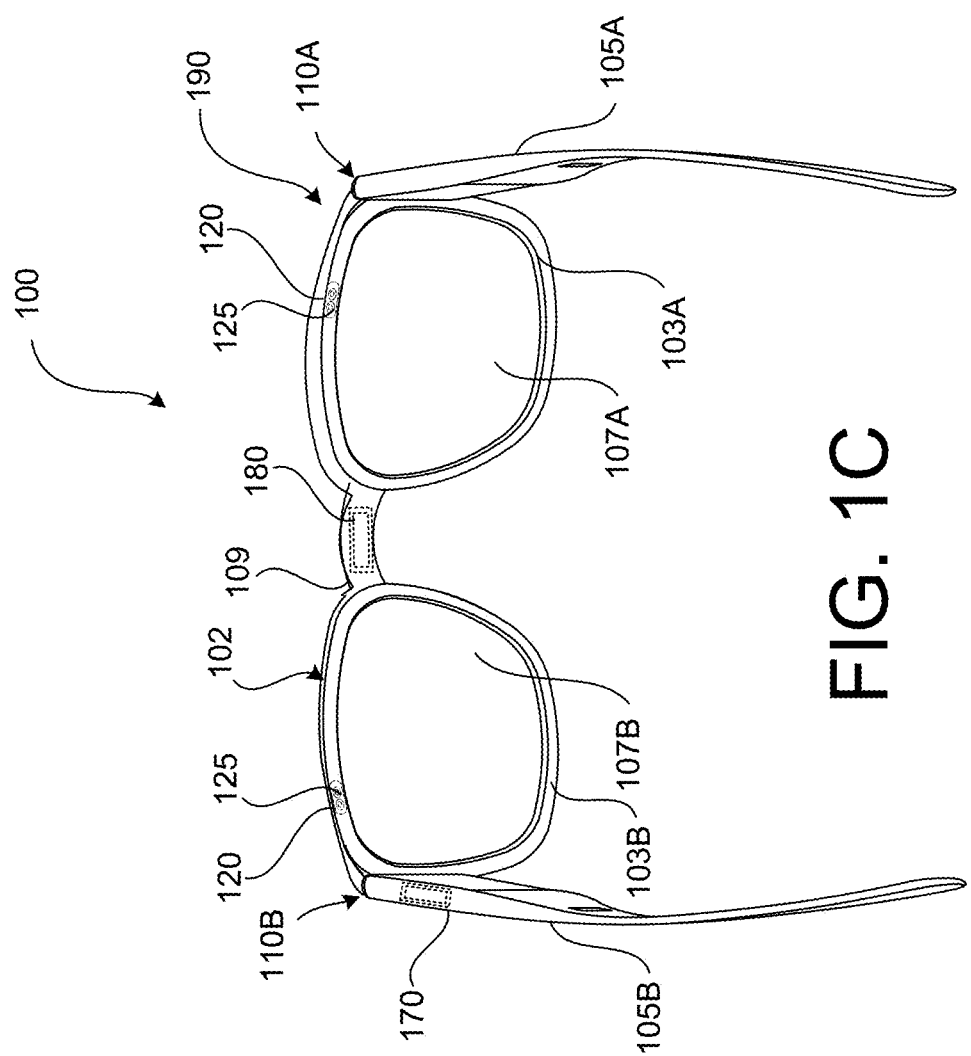
FIG. 1C is a rear view.

In some examples, the head mounted wearable device 100 may include one or more gaze tracking devices 120 including, for example, one or more sensors 125, to detect and track eye gaze direction, eye gaze movement, and the like (see FIG. 1C). In some examples, the head mounted wearable device 100 may include a microcontroller 180 that controls input of stimuli to the frame 190. In the example arrangement shown in FIGS. 1B-1D, the microcontroller 180 is positioned in a portion of the bridge portion 109 of the frame 190, simply for purposes of discussion and illustration. The principles to be described herein may be applied to arrangements in which the microcontroller 180 is positioned in other portions of the frame 190. Stimuli input to the frame 190 may selectively cause deformation of the frame 190, and in particular to the rim portions 103 of the frame 190, and in turn to the lens portions 107 received in the rim portions 103. This selective deformation of the rim portions 103 and corresponding deformation of the lens portions 107 may provide for operation of the head mounted wearable device 100 in a first mode providing for far distance vision correction, and in a second mode providing for near distance vision correction. In some examples, the head mounted wearable device 100 may include a power storage device 170, or battery. In the example arrangement shown in FIGS. 1B-1E, the power storage device 170 is positioned in one of the arm portions 105 of the frame 190, simply for purposes of discussion and illustration. The principles to be described herein may be applied to arrangements in which the power storage device 170 is positioned in other portions of the frame 190. The power storage device 170 may provide power to the microcontroller 180 and the sensor(s) 125 of the gaze tracking device(s) 120, for the selective application of stimuli to the frame 190.

Figure 1F:
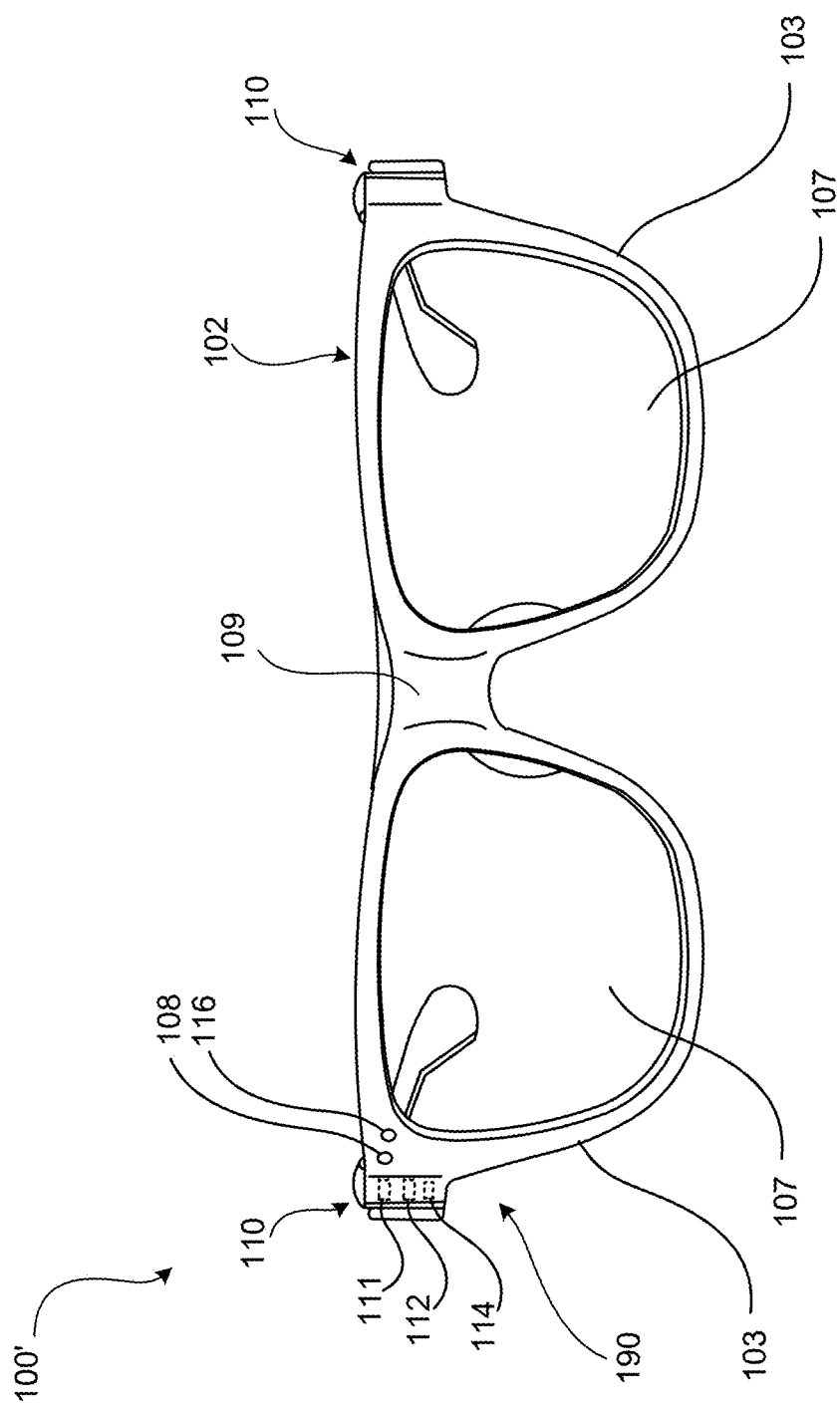
FIG. 1F is a front view.
Figure 1G:
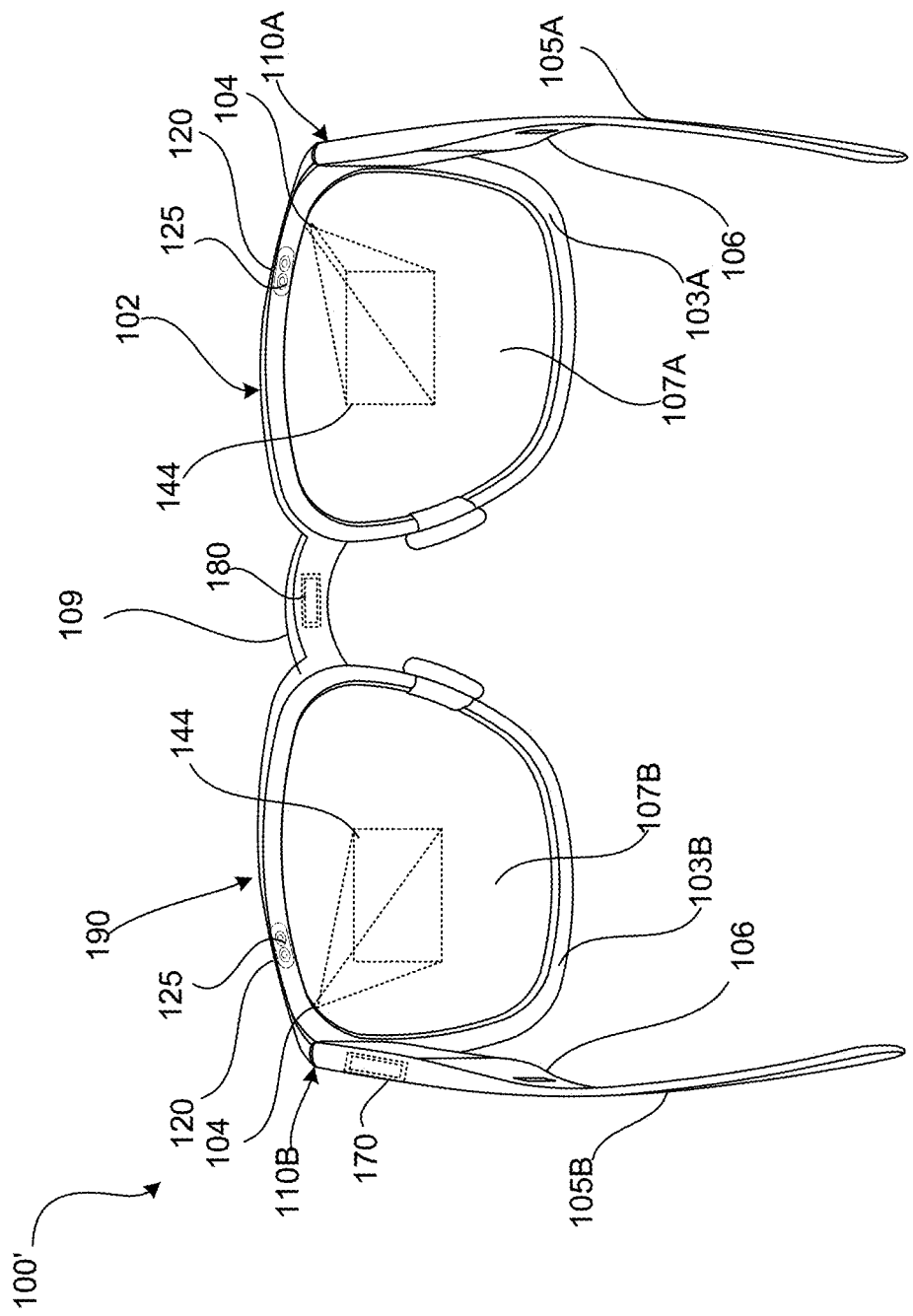
FIG. 1G is a rear view, of an example head mounted wearable device that may be worn by the user shown in FIG. 1A, in accordance with implementations described herein

FIG. 1F is a front view, and FIG. 1G is a rear view, of an example head mounted wearable device 100' including display capability and processing/computing capability. The example head mounted wearable device 100' shown in FIGS. 1F and 1G is configured similarly to the example head mounted wearable device 100 shown in FIGS. 1B-1E. However, the head mounted wearable device 100' shown in FIGS. 1F and 1G includes a display device 104 coupled in a portion of the frame 190. An eye box extends toward the lens portions 107, for output of content at an output coupler 144, at which content output by the display device 104 may be visible to the user. In some examples, the output coupler 144 may be substantially coincident with the lens portions 107. In some examples, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lens portions 107, next to content (for example, digital images, user interface elements, virtual content, and the like) generated by the display device 104. In some implementations, waveguide optics may be used to depict content on the display device 104. In some examples, the head mounted wearable device 100' can also include an audio output device 106 (such as, for example, one or more speakers), an illumination device 108, a sensing system 111, a control system 112, at least one processor 114, and an outward facing image sensor 116, or camera.

In some examples, the frame 190 of the head mounted wearable device 100 may include an elastic material, for example, an elastic metal material having shape memory properties. One such material may be an elastic metal alloy such as, for example, nitinol. Due to the elastic properties of the frame 190, the frame 190 of the head mounted wearable device 100 may thus be adaptable, for example, deformable, in response to a stimulus applied to the frame 190. Deformation of the frame 190, and in particular, deformation of the rim portions 103 of the frame 190, may in turn cause a change in the contour of the lens portions 107 respectively received in the rim portions 103. This may allow the lens portions 107 to provide for both far distance vision correction in a first mode, and near distance vision correction in a second mode.

Figure 2A:
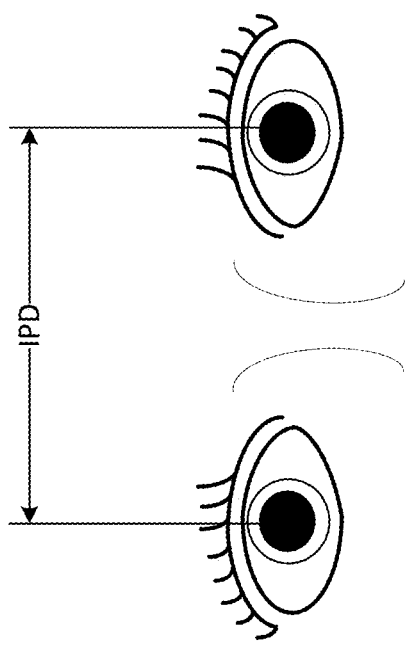
FIGS. 2A-2C are schematic diagrams illustrating interpupillary distance.
Figure 2C:
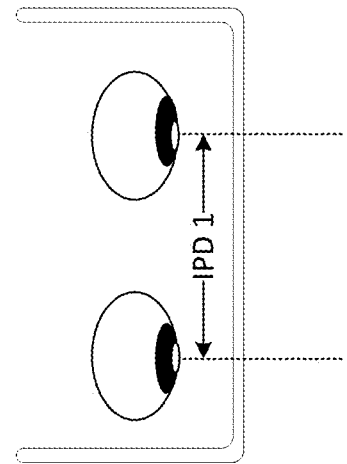
Figure 2B:
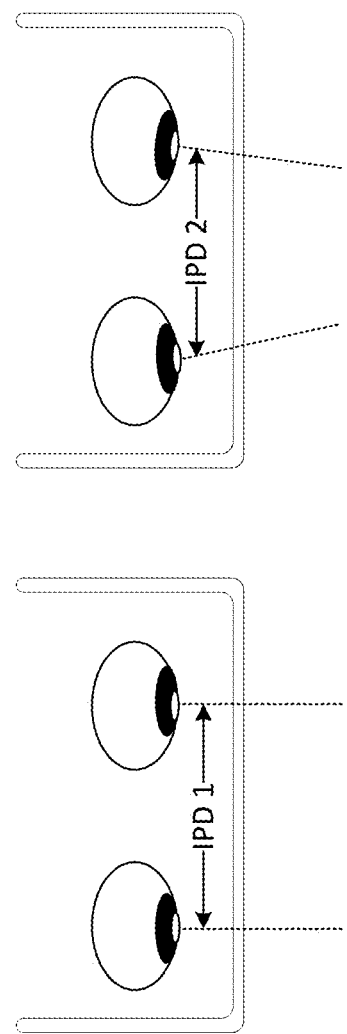

In some examples, data captured by the one or more gaze tracking device(s) 120/sensor(s) 125 may be processed to detect and track eye gaze direction, eye gaze movement, and the like. This data may, in turn, be used to determine an interpupillary distance (IPD), or a distance between the left pupil and the right pupil of the user as illustrated in FIG. 2A. In some examples, the interpupillary distance may be indicative of whether the user's gaze is focused on an object in the far field (in which the user would make user of far distance vision/far distance vision correction), or an object in the near field (in which the user would make use of near distance vision/near distance vision correction). In general, when the pupils of the user are further apart, sight lines from the user's eyes are substantially in parallel, and the user's gaze is directed further in the distance. This is illustrated in the top view shown in FIG. 2B, in which the user's gaze is directed to an object in the far field, and the pupils are separated by a first interpupillary distance IPD 1. Similarly, when the pupils of the user are closer together, as shown in FIG. 2C, sight lines from the user's eyes move toward convergence on an object in the near field. This is illustrated in the top view shown in FIG. 2C, in which the user's gaze is directed to an object in the near field, and the pupils are separated by a second interpupillary distance IPD 2 that is less than the first interpupillary distance IPD 1. Thus, data captured by the one or more gaze tracking device(s) 120/sensor(s) 125 may be used by the microcontroller 180 to determine interpupillary distance and to selectively apply a stimulus to the frame 190 that will cause the frame 190 to deform, and a contour of the lens portions 107 to change to adapt to the visual focus of the user/visual needs of the user.

Hereinafter, systems and methods, in accordance with implementations described herein, will be described with respect to an example head mounted wearable device, such as the head mounted wearable device 100 described above with respect to FIGS. 1A-1E, simply for purposes of discussion and illustration. The principles to be described herein may be similarly applied to the example head mounted wearable device 100' prime described above with respect to FIGS. 1F and 1G, including display capability and/or computing/processing capability. The principles to be described herein may be similarly applied to other head mounted wearable devices which may benefit from the ability to provide for both near distance vision/near distance vision correction and far distance vision/far distance vision correction.

FIG. 3A is a front view of the front frame portion 102 of the frame 190 of the example head mounted wearable device 100 or the head mounted wearable device 100'. FIG. 3B is a cross-sectional view taken along line A-A of FIG. 3A. FIGS. 3A and 3B illustrate the front frame portion 102 of the frame 190 of the example head mounted wearable device 100/100' in a first mode, in which the frame 190 (and in particular the front frame portion 102 including the rim portions 103A, 103B and the lens portions 107A, 107B) is in a neutral state.

Figures 4A, 4B:
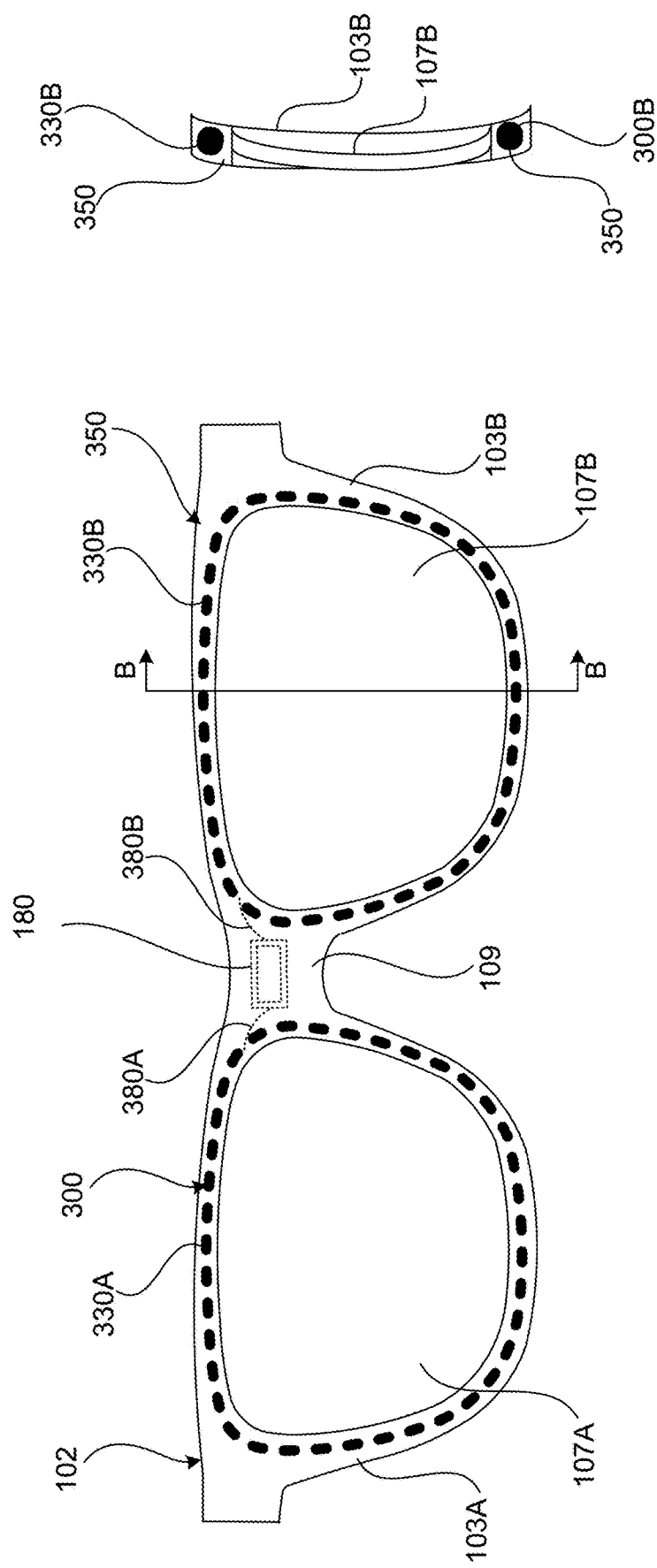
FIGS. 4A and 4B illustrate a front frame portion of the example head mounted wearable device shown in FIGS. 1A-1F in a second state, in accordance with implementations described herein.

FIG. 4A is a front view of the front frame portion 102 of the frame 190 of the example head mounted wearable device 100/100'. FIG. 4B is a cross-sectional view taken along line B-B of FIG. 4A. FIGS. 4A and 4B illustrate the front frame portion 102 of the frame 190 of the head mounted wearable device 100/100' in a second mode, in which the frame 190 (and in particular, the front frame portion 102 including the rim portions 103A, 103B and the lens portions 107A, 107B) is in an actuated state. In the actuated state shown in FIGS. 4A and 4B, a stimulus has been applied to the frame 190, and in particular to a deformable inner frame 300, causing deformation of the rim portions 103A, 103B, and a corresponding change in a contour of the respective lens portions 107A, 107B.

As shown in FIGS. 3A and 3B, the front frame portion 102 (defined by the rim portions 103A, 103B and the bridge portion 109 of the frame 190) includes a deformable inner frame 300. The deformable inner frame 300 includes a first deformable member 330A corresponding to the first rim portion 103A, and a second deformable member 330B corresponding to the second rim portion 103B. In some examples, the first deformable member 330A and the second deformable member 330B are made of an elastic metal material having shape memory properties such as, for example, an elastic metal alloy such as nitinol. In some examples, a first connector 380A connects the microcontroller 180 to the first deformable member 330A, so that a stimulus generated by the microcontroller 180 may be selectively applied to the first deformable member 330A. A second connector 380B may connect the microcontroller 180 to the second deformable member 330B so that a stimulus generated by the microcontroller 180 may be selectively applied to the second deformable member 330B. In some examples, the stimulus may be in the form of, for example, a voltage or a current that is generated by the microcontroller 180 and transmitted to the first deformable member 330A and the second deformable member 330B via the first connector 380A and the second connector 380B, respectively. The stimulus applied to the first and second deformable members 330A, 330B may heat the first and second deformable members 330A, 330B. Application of the stimulus and heating of the first and second deformable members 330A, 330B of the deformable inner frame 300 in this manner may cause the first and second deformable members 330A, 330B to deform, from the neutral state shown in FIGS. 3A and 3B, to the deformed state shown in FIGS. 4A and 4B.

In some examples, an outer layer 350 surrounds the deformable inner frame 300. The outer layer 350 may be made of a flexible or elastically deformable material so that the outer layer 350 deforms together with the deformable inner frame 300. In some examples, the outer layer 350 is formed integrally, or as a single unit, with the bridge portion 109. In some examples, the outer layer 350 may include an insulating material. The insulating material of the outer layer 350 may retain the heat, generated in response to the application of the stimulus, in the first and second deformable members 330A, 330B of the deformable inner frame 300. Retention of the heat in the first and second deformable members 330A, 330B of the deformable inner frame 300 may ensure that the desired deformed state is maintained. Retention of the heat in the first and second deformable members 330A, 330B, due to insulative properties of the outer layer 350, may ensure that the heat is not transferred to the user, which could otherwise cause the user discomfort while wearing the head mounted wearable device 100/100'.

In some examples, corresponding stimuli are substantially simultaneously applied to the first deformable member 330A and the second deformable member 330B so that the first and second rim portions 103A, 103B (and the first and second lens portions 107A, 107B) are deformed substantially simultaneously. In some examples, as the components of the deformable inner frame 300 do not extend into the bridge portion 109, the bridge portion 109 may remain in a substantially neutral, undeformed configuration while the first and second rim portions 103A, 103B are deformed in response to the stimuli applied to the deformable inner frame 300.

As noted above, the deformable inner frame 300 including the first deformable member 330A and the second deformable member 300B may be made of an elastic metal material having shape memory properties such as, for example, an elastic metal alloy such as nitinol. Such materials can be pre-treated and pre-formed so that the material has certain pre-set shapes, or contours, or configurations. Due to the shape memory properties associated with nitinol and other types of shape memory materials, the pre-set shapes, or contours, or configurations may be maintained in the material structure of the nitinol. The pre-set shapes, or contours, or configurations, may correspond to set amounts of heat applied to the material.

Figure 5B:
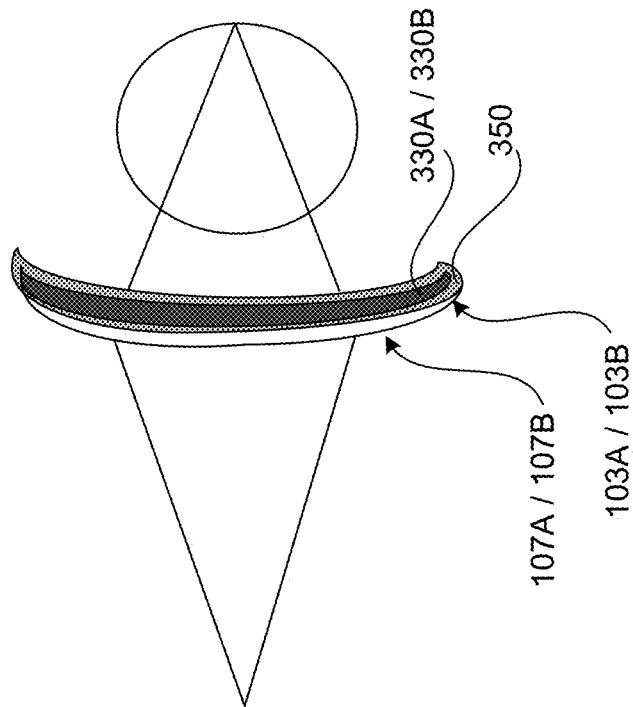
FIG. 5B is a schematic illustration of the second state shown in FIGS. 4A and 4B.
Figure 5A:
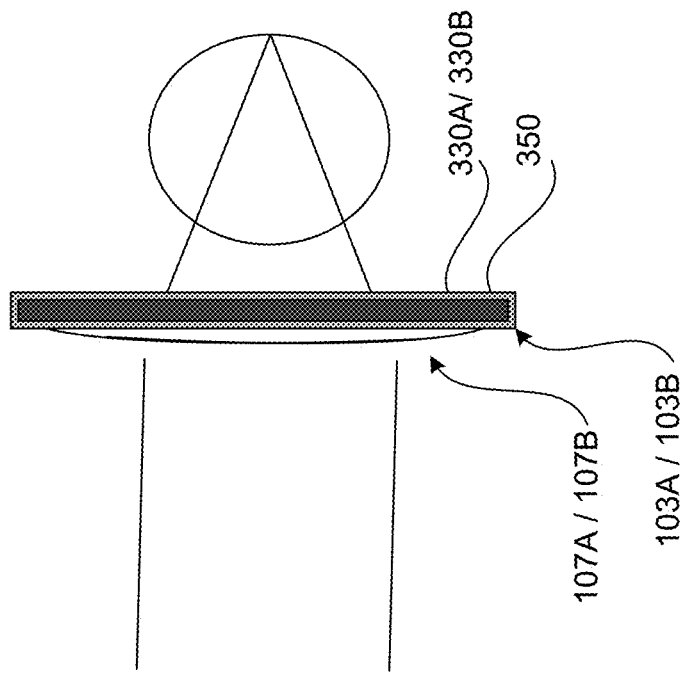
FIG. 5A is a schematic illustration of the first state shown in FIGS. 3A and 3B.

In the example shown in FIGS. 3A and 3B, the neutral state may correspond to a state in which no stimulus (i.e., no voltage, or no current) is applied to the deformable inner frame 300. In this example, the neutral state may correspond to the first mode, in which the head mounted wearable device 100 is configured to provide for far distance vision, as shown in FIG. 5A, simply for purposes of discussion and illustration. In the neutral state, no stimulus is applied by the microcontroller 180 to the deformable inner frame 300, and the first and second rim portions 103A, 103B and the lens portions 107A, 107B held therein are in a first configuration, corresponding to far distance vision. That is, in the neutral state shown in FIG. 5A, the first and second rim portions 103A, 103B and the lens portions 107A, 107B held therein are in a neutral, or cold state, or a neutral or cold configuration, and thus not deformed. This neutral or cold configuration may correspond to a first pre-set configuration of the shape memory metal alloy material of the deformable inner frame 300. As described above, in some examples, the control of the application of stimulus by the microcontroller 180 and the resulting configuration, or state of the deformable inner frame 300 (and the corresponding configuration, or state of the rim portions 103A, 103B and lens portions 107A, 107B) may be determined based on a detected interpupillary distance. That is, in some examples, the interpupillary distance may be detected and tracked based on image data collected by the gaze tracking device(s) 120. The microcontroller 180 may in turn control the application of stimuli (i.e., voltage/current to the deformable inner frame 300) based on an interpupillary distance detected in the image data.

In the example shown in FIGS. 4A and 4B, the actuated state may correspond to a state in which a stimulus (i.e., a voltage, or a current) is applied to the deformable inner frame 300. In this example, the actuated state may correspond to the second mode, in which the head mounted wearable device 100 is configured to provide for near distance vision, as shown in FIG. 5B, simply for purposes of discussion and illustration. From the neutral state shown in FIGS. 3A and 3B, a stimulus is applied by the microcontroller 180 to the deformable inner frame 300, and the first and second rim portions 103A, 103B and the lens portions 107A, 107B held therein transition to the second configuration shown in FIGS. 4A and 4B, corresponding to near distance vision. That is, in the actuated state shown in FIG. 5B, the first and second rim portions 103A, 103B and the lens portions 107A, 107B held therein are in deformed, or heated state, or a deformed, or heated configuration, in which the stimulus applied by the microcontroller 180 has caused the deformable inner frame 300 to transition from the neutral state shown in FIG. 5A to the actuated, deformed state shown in FIG. 5B. This deformed, or heated configuration may correspond to a second pre-set configuration of the shape memory metal alloy material of the deformable inner frame 300. As described above, in some examples, the control of the application of stimulus by the microcontroller 180 and the resulting configuration, or state of the deformable inner frame 300 (and the corresponding configuration, or state of the rim portions 103A, 103B and lens portions 107A, 107B) may be determined based on a detected interpupillary distance. Thus, in this example, detection of an interpupillary distance that is less than or equal to a preset threshold interpupillary distance for a particular user, or a detection of a change in interpupillary distance with a preset range, and the like, may trigger this transition, and the application of a stimulus by the microcontroller 180 to cause heating and deformation of the deformable inner frame 300. Similarly, detection of an interpupillary distance that is greater than the preset threshold, and/or outside of the present range, may trigger a transition causing the microcontroller to terminate the application of the stimulus, and the deformable inner frame 300 to revert back to the neutral state.

In some examples, the neutral state and the actuated state may be set for a particular user, based on the vision correction needs of the user. In some examples, a technician may perform an initialization process to vary an amount of stimulus applied by the microcontroller 180 and set an amount of deformation of the deformable inner frame 300 needed to provide for near distance vision/near distance vision correction for the user in the actuated state. In some examples, this initialization process may be carried out by the user through use of a proctor in a remote setting, and/or in a self-directed manner through, for example, an application executing on a connected computing device. The shape memory properties of the material of the deformable inner frame 300 may allow the actuated configuration of the deformable inner frame 300 to be set in the material memory of the deformable inner frame 300. Subsequent application of stimulus to the deformable inner frame 300 will cause the deformable inner frame 300 to return to the actuated configuration. Removal of the stimulus allows the deformable inner frame 300 to return to the neutral state.

In the examples described above, the neutral state (in which no stimulus is applied to the deformable inner frame 300) corresponds to a state in which the head mounted wearable device 100 is configured to provide for far distance vision, simply for purposes of discussion and illustration. In the examples described above, the actuated state (in which a stimulus is applied to the deformable inner frame 300 to cause deformation of the rim portions 103A, 103B and lens portions 107A, 107B held therein) corresponds to a state in which the head mounted wearable device 100 is configured to provide for near distance vision, simply for purposes of discussion and illustration. The principles described herein may apply to an arrangement in which the neutral state corresponds to a state in which the head mounted wearable device 100/100' is configured to provide for near distance vision, and the actuated state corresponds to a state in which the head mounted wearable device 100 is configured to provide for far distance vision. Similarly, the principles described herein may be applied to a head mounted wearable device 100/100' including additional and/or multiple different actuated states.

Figure 6:
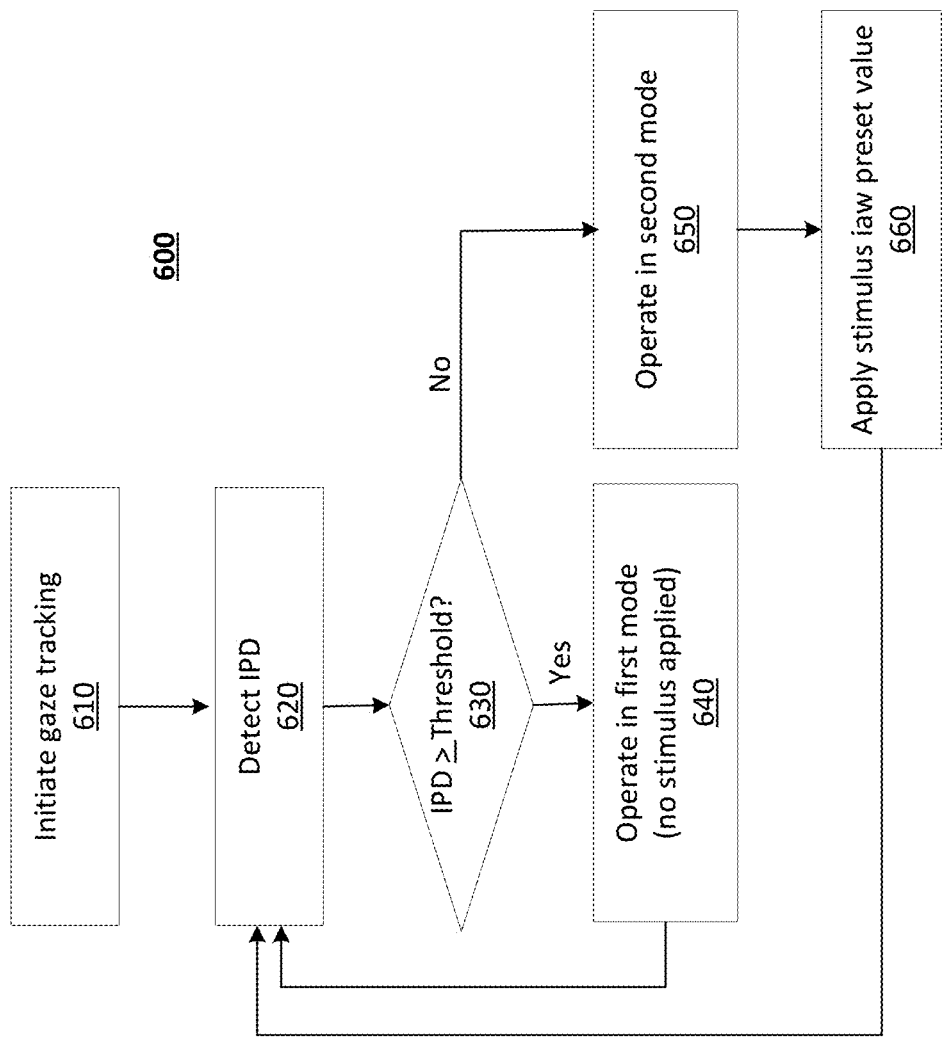
FIG. 6 is a flowchart of an example method, in accordance with implementations described herein.

FIG. 6 is a flowchart of an example method 600, in accordance with implementations described herein. The example method 600 may be executed by a head mounted wearable device, such as, for example, the head mounted wearable device 100 and/or the head mounted wearable device 100' described above, including components such as, for example, a microcontroller 180 and/or other controllers and/or processors capable of executing the example method 600. Gaze tracking may be initiated (block 610) and the head mounted wearable device. In some examples, gaze tracking may be performed by a gaze tracking device incorporated in the head mounted wearable device, such as, for example the gaze tracking device 120 described above. The gaze tracking device may track eye gaze of a user wearing the head mounted wearable device, so that interpupillary distance may be detected (block 620). In some examples, an interpupillary distance that is greater than or equal to a set threshold may indicate a user gaze that is directed in the far distance, as described above with respect to FIGS. 2A-2C. An interpupillary distance that is less than the set threshold may indicate a user gaze that is directed to the near field, as described above with respect to FIGS. 2A-2C.

In the example method 600 shown in FIG. 6, if it is determined that the interpupillary distance is greater than or equal to the previously set threshold (block 630), it may be determined that the user gaze is directed to the far field, or in the distance, and thus the head mounted wearable device is to operate in the first mode (block 640). That is, in the example method 600 shown in FIG. 6, the head mounted wearable device in the first mode is in a neutral, or at rest, or unactuated, state and configured for distance vision. Thus, in the first mode, no stimulus is applied to the deformable inner frame, as described above with respect to FIGS. 3A and 3B. If it is determined that the interpupillary distance is less than the previously set threshold (block 630), it may be determined that the user gaze is directed to the near field, or close in, and thus the head mounted wearable device is to operate in the second mode (block 650). That is, in the example method 600 shown in FIG. 6, in the second mode a stimulus is applied to the deformable inner frame, as described above with respect to FIGS. 4A and 4B (block 660). In the second mode, the stimulus may be applied in accordance with a preset value (for example, a preset voltage, a preset current, and the like) that causes a desired amount of deformation of the deformable inner frame (and the outer layer and lenses) to generate the desired amount of vision correction. In some examples, gaze tracking may be substantially continuously performed, so that interpupillary distance may be substantially continuously detected, and operation of the head mounted wearable device can transition between the first mode of operation and the second mode of operation in response to detected user gaze.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A head mounted wearable device, comprising:
   a frame, including:
      a rim portion;
      a bridge portion extending from the rim portion;
      an inner frame disposed in the rim portion; and
      a lens coupled in the rim portion; and
   a microcontroller coupled to the frame, wherein
      the microcontroller is configured to apply a stimulus to the inner frame that causes the inner frame to transition from a first shape to a second shape; and
      the rim portion and the lens are flexible and deform in response to the inner frame transitioning from the first shape to the second shape.

2. The head mounted wearable device of claim 1, wherein a contour of the lens is configured to change in response to the inner frame transitioning from the first shape to the second shape.

3. The head mounted wearable device of claim 2, wherein the first shape is a neutral shape in which no stimulus is applied to the inner frame, the frame of the head mounted wearable device is in an undeformed state, and the lens is configured for far distance vision; and
the second shape is an actuated shape in which the stimulus is applied to the inner frame, the frame of the head mounted wearable device is in a deformed state, and the lens is configured for near distance vision.

4. The head mounted wearable device of claim 3, wherein the inner frame is configured to remain in the second shape in response to continued application of the stimulus to the inner frame by the microcontroller; and
the inner frame is configured to revert to the first shape in response to termination of the stimulus applied to the inner frame.

5. The head mounted wearable device of claim 1, wherein the frame includes an outer layer surrounding the inner frame, wherein the outer layer includes an insulating material that retains heat in the inner frame in the second shape.

6. The head mounted wearable device of claim 1, further comprising a gaze tracking device coupled to the frame and configured to collect eye gaze data, wherein the microcontroller is configured to apply the stimulus to the inner frame based on the eye gaze data collected by the gaze tracking device.

7. The head mounted wearable device of claim 6, wherein the microcontroller is configured to:
   detect an interpupillary distance based on the eye gaze data collected by the gaze tracking device;
   apply the stimulus to the inner frame in response to a determination that the interpupillary distance is less than or equal to a set threshold interpupillary distance; and
   terminate application of the stimulus in response to a determination that the interpupillary distance is greater than the set threshold interpupillary distance.

8. The head mounted wearable device of claim 1, wherein the inner frame is made of a memory shape metal alloy material.

9. The head mounted wearable device of claim 1, wherein the inner frame does not extend into the bridge portion and the bridge portion is not deformed in response to the stimulus applied to the inner frame by the microcontroller.

10. The head mounted wearable device of claim 1, wherein
    a contour of the inner frame corresponds to a contour of the rim portion; and
    a contour of an outer layer surrounding the inner frame corresponds to the contour of the rim portion.

11. A method, comprising:
    operating in a first mode in response to detecting an interpupillary distance detected from eye gaze data of a head mounted wearable device is greater than or equal to a threshold; and
    operating in a second mode in response to detecting the interpupillary distance is less than the threshold, including:
       applying, by a microcontroller of the head mounted wearable device, a stimulus to a deformable inner frame of a frame of the head mounted wearable device; and
       deforming the deformable inner frame in response to the stimulus;
       wherein the deforming includes deforming the deformable inner frame to deform a lens portion supported by the frame to a contour that provides a near field vision correction when the interpupillary distance is less than or equal to the threshold, thereby indicating a user's gaze is focused on an object spaced a near field distance from the head mounted wearable device.

12. The method of claim 11, wherein deforming the deformable inner frame in response to the stimulus includes:
    deforming a first deformable member of the deformable inner frame corresponding to a first rim portion of the frame; and
    deforming a second deformable member of the deformable inner frame corresponding to a second rim portion of the frame.

13. The method of claim 12, wherein the lens portion includes a first lens portion held in the first rim portion and a second lens portion held in the second rim portion, the method further comprising:
    altering a contour of the first lens portion held in the first rim portion in response to deforming the first deformable member and the first rim portion; and
    altering a contour of the second lens portion held in the second rim portion in response to deforming the second deformable member and the second rim portion.

14. The method of claim 11, wherein
in the first mode, a frame of the head mounted wearable device is in a neutral state in which no stimulus is applied to the deformable inner frame, the frame is in an undeformed state, and the lens portion of the head mounted wearable device is configured for far distance vision; and
in the second mode, the frame of the head mounted wearable device is in an actuated state in which the stimulus is applied to the deformable inner frame, the frame of the head mounted wearable device is in a deformed state, and the lens portion is configured for near distance vision.

15. The method of claim 14, further comprising, while operating in the second mode:
detecting that the interpupillary distance is greater than or equal to the threshold;
terminating application of the stimulus to the deformable inner frame; and
reverting to the neutral state in response to terminating the application of the stimulus.

16. The method of claim 11, wherein the deformable inner frame includes:
a first deformable member made of a memory shape metal alloy material, corresponding to a first rim portion of a frame of the head mounted wearable device; and
a second deformable member made of a memory shape metal alloy material, corresponding to a second rim portion of the frame of the head mounted wearable device.

17. The method of claim 16, wherein the deformable inner frame does not extend into a bridge portion extending between the first rim portion and the second rim portion of the frame of the head mounted wearable device, such that the bridge portion is not deformed in response to applying the stimulus to the deformable inner frame.

18. The method of claim 16, wherein the lens portion includes a first lens portion held in the first rim portion and a second lens portion held in the second rim portion, wherein operating in the second mode includes:
deforming the first rim portion and altering a contour of the first lens portion held in the first rim portion in response to applying the stimulus to the first deformable member of the deformable inner frame; and
deforming the second rim portion and altering a contour of the second lens portion held in the second rim portion in response to applying the stimulus to the second deformable member of the deformable inner frame.

* * * * *